July 18, 1939. V. CATINI 2,166,519
SPIRAL BINDING MACHINE
Filed June 6, 1936 5 Sheets-Sheet 1
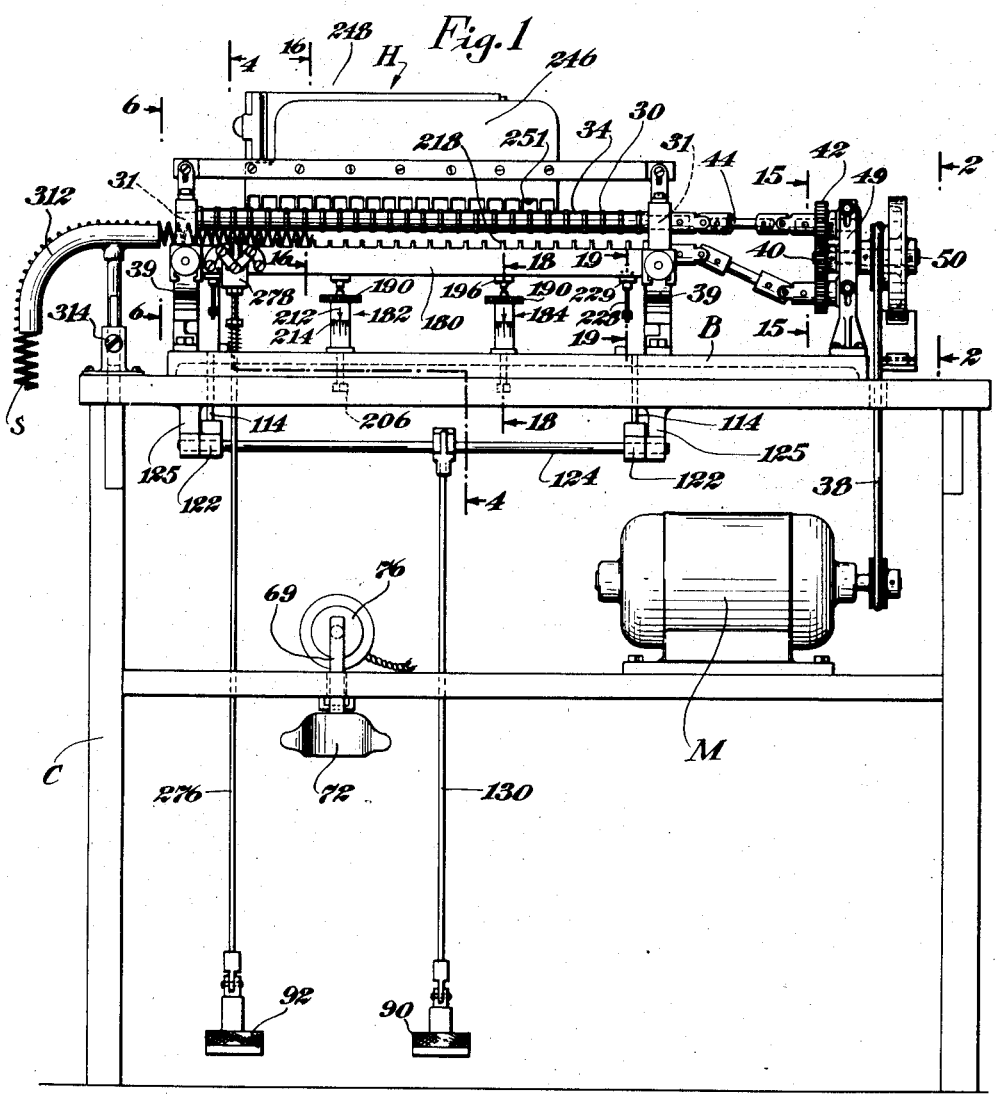
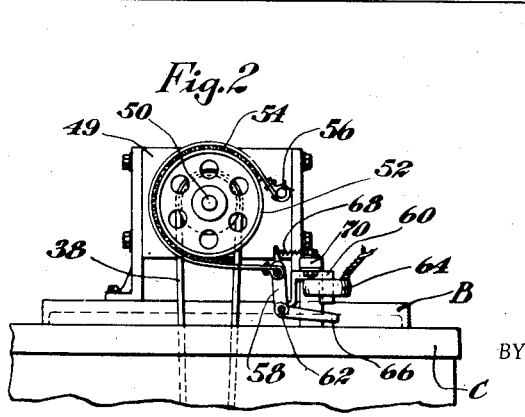
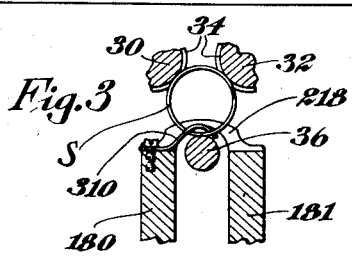
INVENTOR,
Vincenzo Catini,
BY William J. [signature]
ATTORNEY.

July 18, 1939.  V. CATINI  2,166,519
SPIRAL BINDING MACHINE
Filed June 6, 1936  5 Sheets-Sheet 2
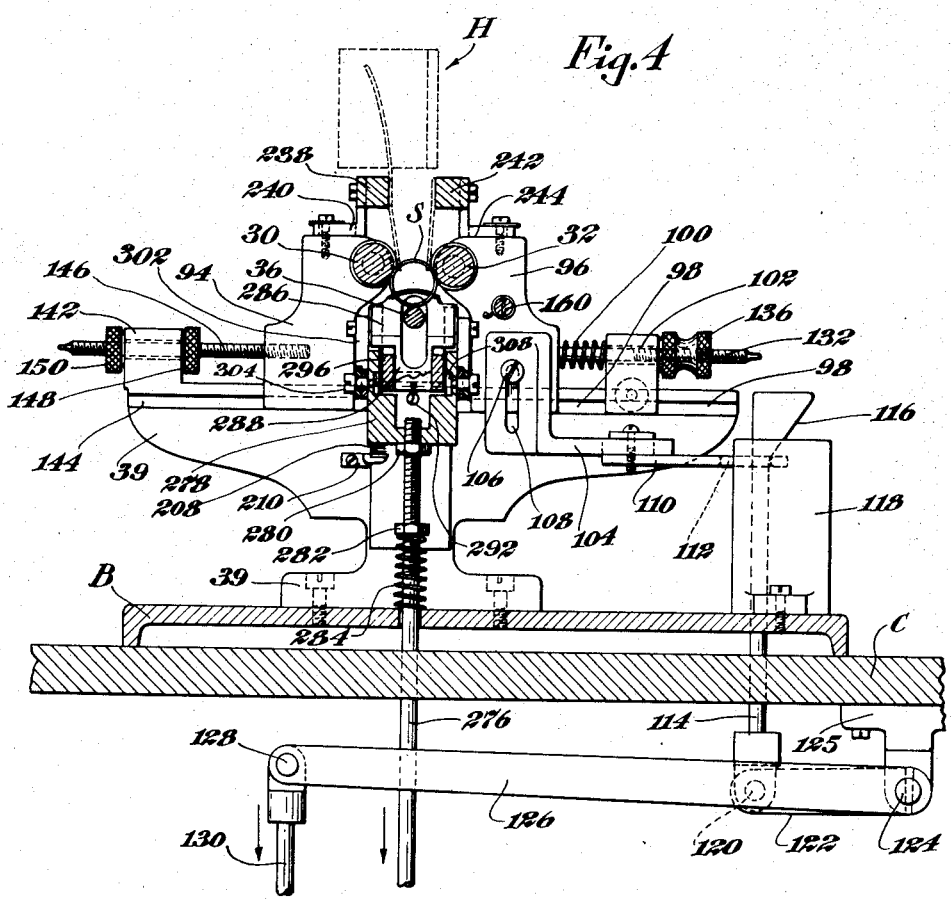
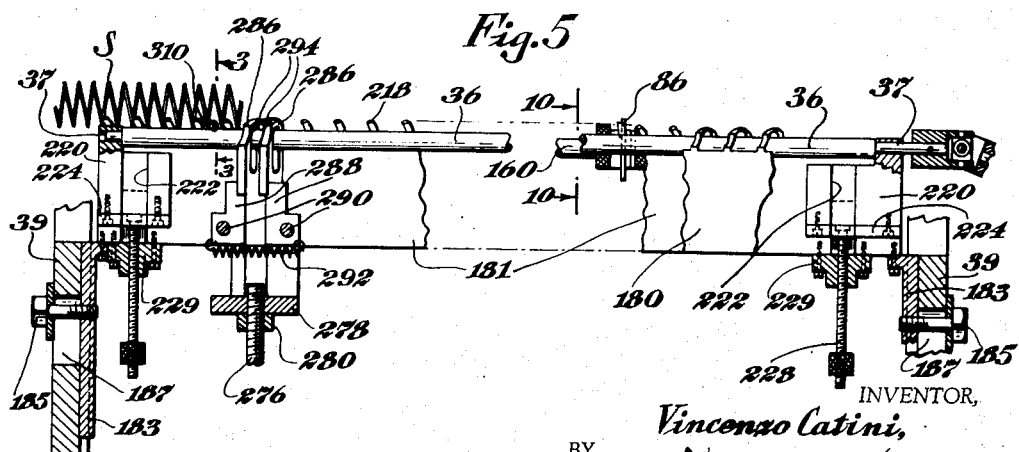
INVENTOR,
Vincenzo Catini,
BY
ATTORNEY.

July 18, 1939.  V. CATINI  2,166,519
SPIRAL BINDING MACHINE
Filed June 6, 1936  5 Sheets-Sheet 3
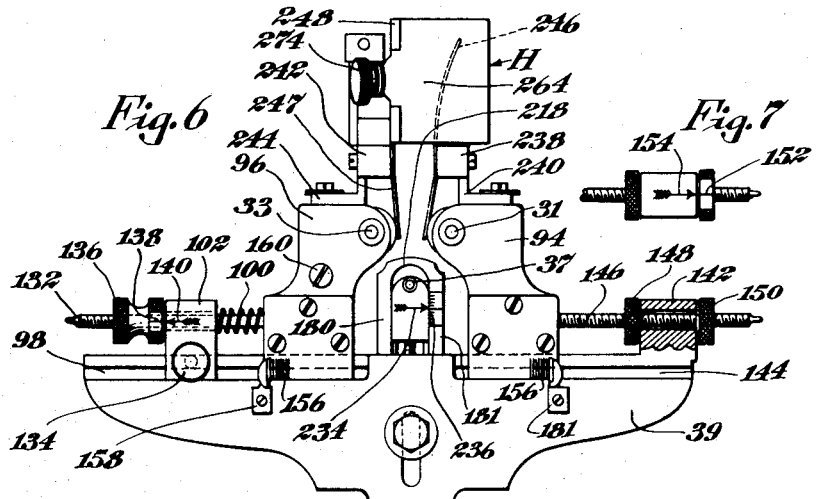
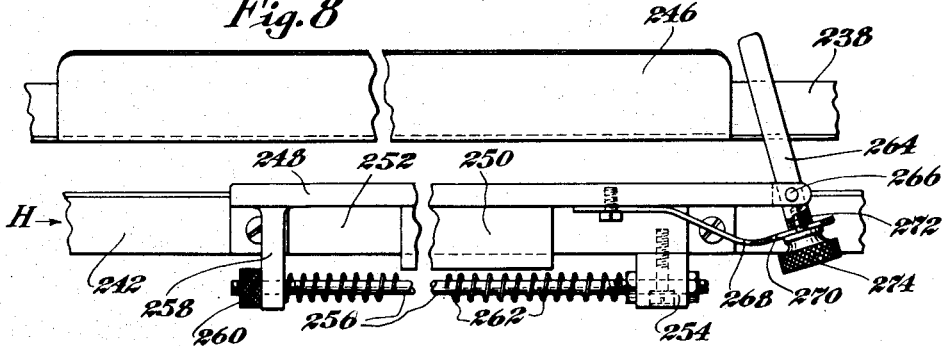
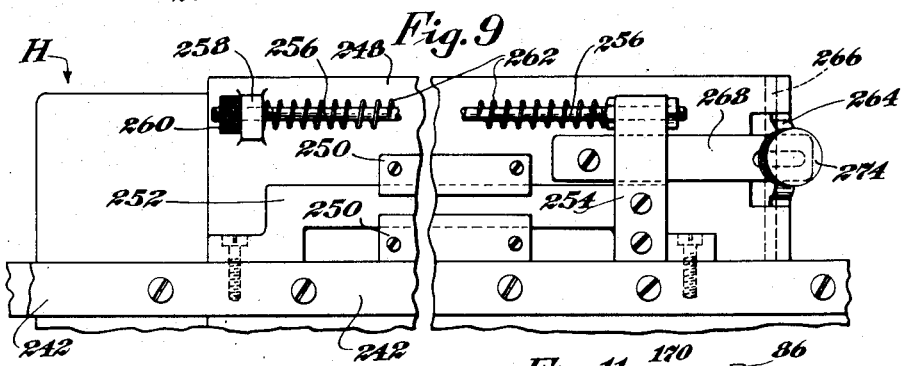
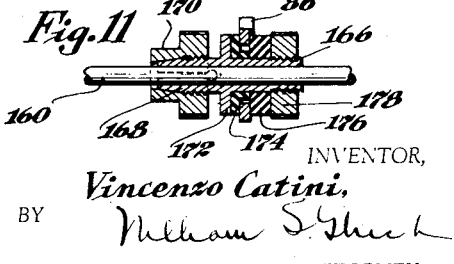
INVENTOR,
Vincenzo Catini,
BY
ATTORNEY.

July 18, 1939.  V. CATINI  2,166,519
SPIRAL BINDING MACHINE
Filed June 6, 1936     5 Sheets-Sheet 4
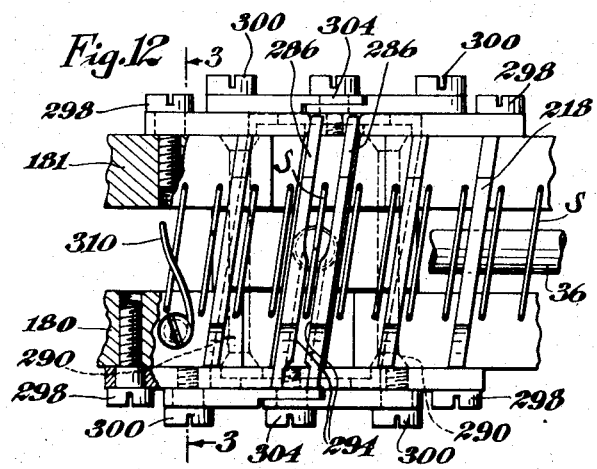
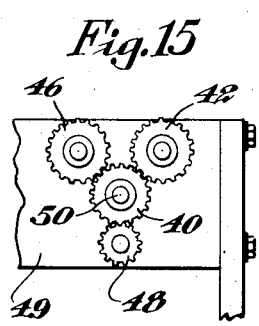
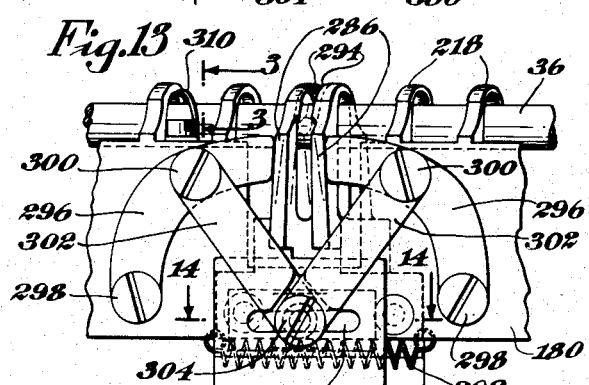
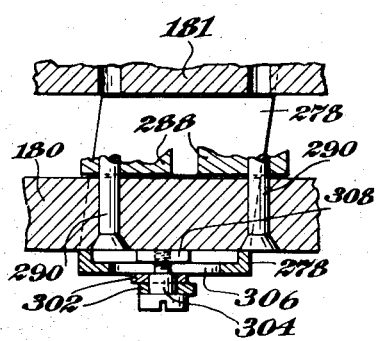
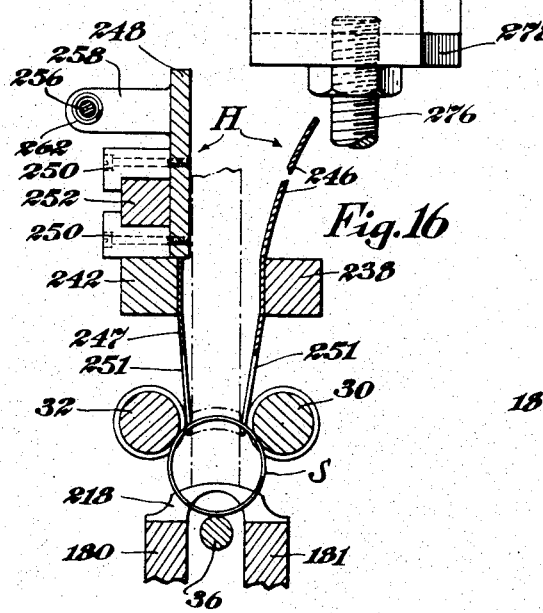
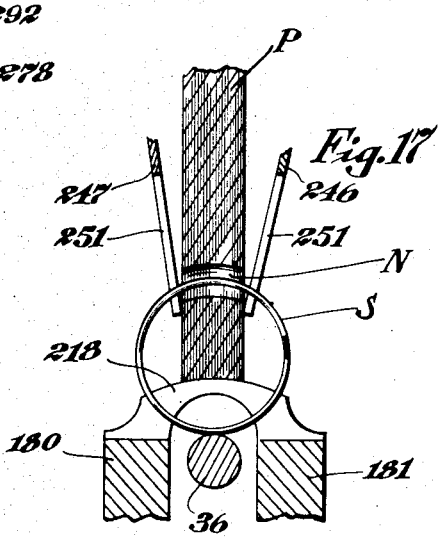
INVENTOR,
Vincenzo Catini,
BY
ATTORNEY.

July 18, 1939.　　　V. CATINI　　　2,166,519
SPIRAL BINDING MACHINE
Filed June 6, 1936　　　5 Sheets-Sheet 5
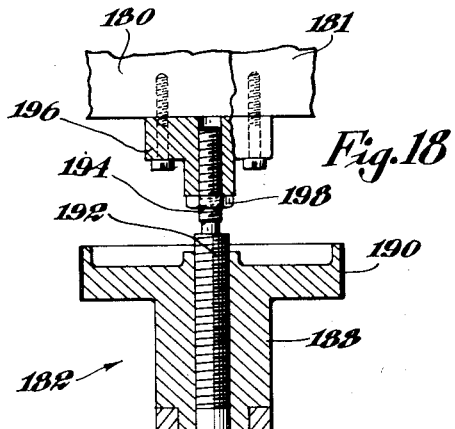
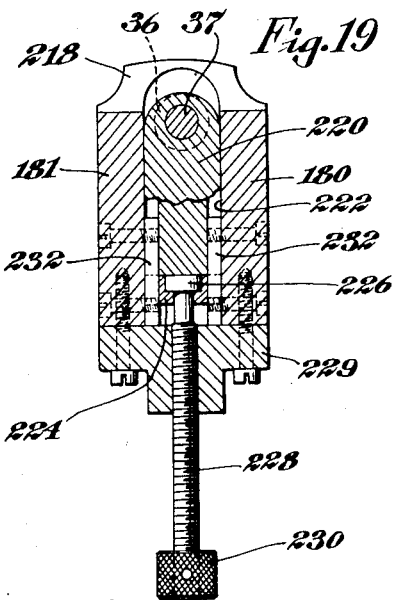
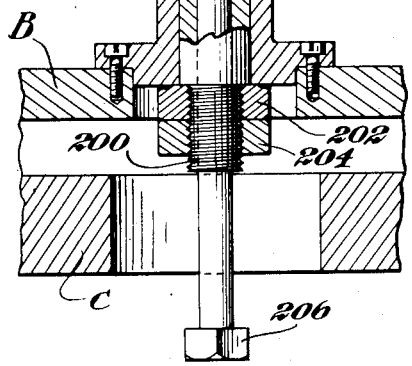
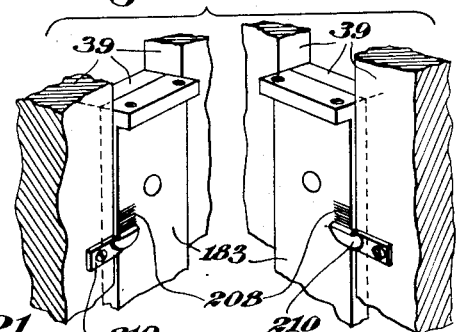
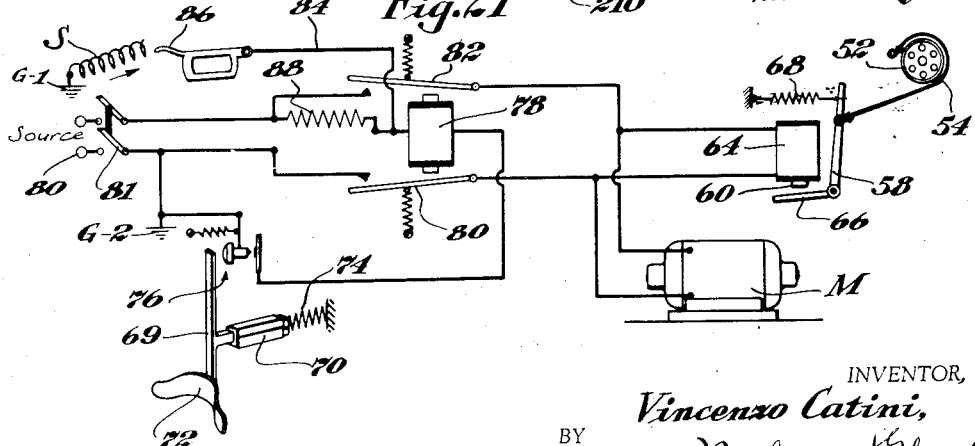
INVENTOR,
Vincenzo Catini,
BY
ATTORNEY.

Patented July 18, 1939

2,166,519

UNITED STATES PATENT OFFICE 2,166,519

SPIRAL BINDING MACHINE

Vincenzo Catini, New York, N. Y., assignor to Spiral Binding Company, Inc., New York, N. Y., a corporation of New York Application June 6, 1936, Serial No. 83,866

10 Claims. (Cl. 11—1)

This invention relates to machines for threading spiral binding elements into stacks of sheets having perforations therein adapted to receive such binding elements, and in particular it relates to a machine of that type in which the spirally coiled wire is caused to rotate and at the same time to advance axially into engagement with the perforations of a stack of sheets.

While my invention has been described in connection with a machine for threading spiral binding elements into a stack of perforated sheets it is to be understood that as to certain phases thereof it may have other applications.

In the type of binding that is commonly known as "spiral binding" the binding element consists of a spirally or helically coiled wire of uniform pitch, and the stack of sheets to which it is applied has a series of perforations, pitched to conform to the pitch of the spiral binding element, through which the spiral binding element is threaded. It is common practice to insert the spiral into these perforations by rotating the same and giving it an axial motion so that it advances screw fashion through the perforations of the stack. While this operation may be, and often is, performed manually, for quantity production machines are used.

Machines for this purpose are however subject to many defects. Among these may be mentioned distortion of the spiral binding element during the threading operation whereby binding may occur. Still more serious is distortion of the end of the spiral as a result of which it may not enter the perforations of the stack at all. If the stack is not properly positioned in relation to the path of the spiral similar troubles occur. When it is attempted to remove the bound stack from the machine the parts of the machine may interfere with such removal, due to improper design thereof. Where the binding element is cut from a length of spirally coiled wire, the cutting mechanism by which the binding element is severed from the main body of the spirally coiled wire may not function properly, so that when it is attempted to remove the bound element it is found that the binding element will not separate from the main body of the spiral. Where such means, either manual or automatic are used, it may be found that the motion of the spiral is not stopped at the right moment whereby a defective product results, necessitating the trimming of the excess length of the spiral or discarding the product because the spiral elements are too short. Many other defects might be mentioned.

It is among the general objects of my invention to provide a machine in which all of the aforementioned and other defects will be overcome, and in which the parts may be accurately and conveniently adjusted in relation to each other, and the control of the machine be effected by the operator with certainty and with comparative freedom from fatigue even after extended operation, and whereby a thoroughly satisfactory product may be produced with a minimum expenditure of time, labor and a minimum cost of equipment, operation and maintenance.

For the attainment of these objects and such other objects as may hereinafter appear or be pointed out I have shown one embodiment of my invention in the drawings, in which:

Figure 1 is a front elevational view of my improved machine;

Figure 2 is an end elevational view of my machine on the line 2—2 of Figure 1, looking in the direction of the arrows, and showing particularly the braking means for stopping the rotation of the spiral advancing means;

Figure 3 is a sectional view, on the line 3—3 of Figures 5, 12 and 13, looking in the direction of the arrows, and showing a detail of my machine;

Figure 4 is a transverse sectional view on the line 4—4 of Figure 1, looking in the direction of the arrows;

Figure 5 is a front elevational view of a portion of the machine with parts broken away to expose the interior construction;

Figure 6 is an end view of the machine on the line 6—6 of Figure 1, looking in the direction of the arrows, and portions being shown in section;

Figure 7 is a detail view of one of the adjusting devices shown in Figure 6;

Figure 8 is a plan view of the guide means for holding stacks in the machine in proper threading relation to the spiral binding element;

Figure 9 is an elevational view of the stack holder as seen from the rear of Figure 1 or from a point below Figure 8;

Figure 10 is a sectional view on the line 10—10 of Figure 5, looking in the direction of the arrows, and showing a detail of the machine;

Figure 11 is a sectional view on the line 11—11 of Figure 10, looking in the direction of the arrows;

Figure 12 is a plan view, partly in section, and on a greatly enlarged scale, of the cutting mechanism and the adjacent parts;

Figure 13 is a front elevational view of the portions of the machine shown in Figure 12, and shows these parts as viewed from a point below Figure 12;

Figure 14 is a sectional view on the line 14—14 of Figure 13, looking in the direction of the arrows;

Figure 15 is a sectional view on the line 15—15 of Figure 1, looking in the direction of the arrows, and showing a portion of the power transmission mechanism;

Figure 16 is a sectional view on the line 16—16 of Figure 1, looking in the direction of the arrows;

Figure 17 is a view, on an enlarged scale, of the lower portion of Figure 16, showing a stack, in place on the machine, with a spiral binding element threaded therethrough;

Figure 18 is a sectional view on a greatly enlarged scale taken on the line 18—18 of Figure 1, looking in the direction of the arrows, and showing a constructional detail;

Figure 19 is a sectional view on a greatly enlarged scale taken on the line 19—19 of Figure 1, looking in the direction of the arrows and showing a constructional detail;

Figure 20 is a view of portions of the inner end surfaces of the end frame of the machine showing the indicating arrangements thereon, these ends being shown side by side for purposes of comparison; and Figure 21 is a diagrammatic view of the electric circuits by means of which the operation of the machine is controlled.

Before describing my invention in detail, I will premise that it comprises in general a system of rotating rollers adapted to surround and engage a spirally coiled wire, and by their rotation to cause the spiral to advance in screw fashion, and to enter the perforations of a stack of sheets to be bound. Associated with this roller system is a means for causing rotation thereof, which comprises a source of motive power and suitable transmission mechanism.

I have also provided in connection with said roller system a braking device in such operative relation to the motive power and the controls therefor, that when the motive power is used to activate the rollers, the braking device assumes an inactive position, while as soon as the motive power is thrown off, the braking device becomes active to lock the rollers against rotation and thereby to stop the advance of the spiral.

Associated with said roller system there is further provided a stop mechanism which has a portion thereof interposed in the path of the advancing spiral. When the advancing spiral contacts this portion the motive power is automatically thrown off, and thereby the stopping of the spiral at a predetermined point in relation to the machine is effected.

My invention further comprises means for positioning a stack of perforated sheets with the perforations thereof in threading relation to the advancing spiral and further comprises means for severing a portion of the spiral, of a length sufficient to constitute a binding element for a stack of sheets, from the main body of the spiral, after this portion has been threaded into the stack.

In order to control the operation of this machine I have provided a system of suitable manual controls whereby (1) the operation of the machine may be started; whereby (2) after the machine has been automatically brought to a stop, a portion of the spiral may be severed from the main body thereof; and whereby (3) certain portions of the mechanism may be moved out of the way so that the removal of the threaded stack from the machine may be readily effected.

I have further provided a system of adjustments for the rollers in relation to each other and to the stack of sheets to be threaded, which will assure efficient functioning and cooperation of all the parts of the machine.

Referring now to the drawings in detail, it will be observed that I there show a pair of rollers 30 and 32 each journalled in a pair of standards, one located at each end of the machine. The standards for the roller 30 are numbered 94, and the journals thereof 31, while the standards for the roller 32 are numbered 96, and the journals thereof 33. The rollers 30 and 32 are provided with annular grooves 34 on the surface thereof, these grooves being uniformly spaced in conformity to the pitch of a spirally coiled binding element to be inserted into the stack of perforated sheets, so that the coils of such a spiral S may position themselves in these grooves, as indicated in Figures 3 and 4. It will further be observed, as clearly appears from Figure 4, that the rollers 30 and 32 are spaced from each other laterally, and are positioned above a roller 36 which, as may be seen from Figure 5, is shown as smooth and without guide grooves, and the spacing of the rollers is such that the spiral S is accomodated therebetween.

As will be hereinafter described the roller 36 is journalled at 37 in a bearing block 220, which is capable of vertical adjustment, whereby spirals differing in diameter may be accommodated between the rollers, and whereby an accurate adjustment of the rollers in relation to each other and to the spiral may be obtained.

In addition to the lateral adjustment of the rollers 30 and 32, one of them, 32, is movable laterally to a considerable extent, for the purpose of releasing the spiral after it has been bound into the stack from the machine, which release is effected by a movement of the roller 32 upwardly and laterally of the spiral S. Such lateral movement of the roller 32 is attained by the manipulation of a manual control by the operator of the machine whenever he has completed the threading of a stack and desires to remove the same from the machine. The mechanism whereby this is accomplished will be described in detail hereinbelow.

It will be observed that the rollers 30, 32 and 36 are spaced so that each one opposes the other two, whereby the spiral is effectively held and guided. For this purpose a substantially equidistant spacing of the rollers around the circumference of the spiral has been shown, and this spacing is very satisfactory although it may be departed from to a considerable extent as is desired or found necessary.

The standards 94 and 96, just mentioned are shown as mounted on a pair of end frames 39 carried on the bed plate B of the machine, which in turn is mounted on a suitable table or bench C, by which the mounting of the machine at the correct height is attained and which may also serve to accommodate the motor and certain controls for the machine.

All of the rollers are shown as power driven by a mechanism that may be understood from an inspection of Figures 1 and 15. In Figure 1 I have shown an electric motor M mounted on a shelf of the bench C, and serving to rotate, by means of a belt drive 38, a system of gears, of which the central one, 40, mounted on shaft 50, is driven by the aforementioned belt drive 38, and serves to actuate a pinion 42, connected by a universal coupling 44 with the roller 30 while the pinions 46 and 48 are similarly coupled respectively to the rollers 32 and 36.

The shafts carrying all of these gears are shown as journalled in a standard 49 mounted on the bed plate B of the machine.

The shaft 50, carrying gear 40 is shown as carrying a brake drum 52 (see Figures 1 and 2), and engaging the periphery of said brake drum is shown a brake band 54, in the form of a flexible strap fastened to the standard 49 at one end thereof, as shown at 56, while its other end is fastened to the outer end of one arm of a bell crank lever 58, so that as this end of the bell crank lever is suitably moved, the brake band 54 will be caused to engage the brake drum 52, frictionally, and thereby stop the rotation of the shaft 50, and consequently the entire roller system. Before this braking action can take place, however, the motive power is thrown off by a mechanism to be hereinafter described.

Carried by the standard 49 is shown an electromagnet (see Figure 2) having a U-shaped core 60, one leg of which carries the pivot 62 for the bell crank lever 58, while its other leg is surrounded by a magnetizing coil 64. When the coil 64 is energized the arm 66 of the bell crank lever is pulled upwardly thereby moving the other arm of the bell crank lever so as to release the brake band 54, while when the coil 64 is deenergized, the other arm of the bell crank lever will be moved by the tension spring 68 so as to tighten the brake band. The spring 68 is shown as fastened at one end thereof to the bell crank lever and at its other end to a relatively fixed part of the machine, such as the bracket 70 extending from the standard 49, and serving to support the magnet core 60.

By referring to Figures 1 and 5 it will be observed that I have shown a spirally coiled wire S entering between the rollers at one end of the machine, and it is to be understood that the advance thereof between the rollers will be due to the rotation of the rollers, these rollers frictionally engaging the spiral and causing a screw-like advance of the same, which is made positive by the guide grooves 34 of the rollers 30 and 32 that receive the coils of the spiral therewithin.

In order to cause the advance of the spiral at a desired moment I may make use of an electrical control system such as the one shown diagrammatically by way of illustration in Figure 21, and which is suitable for use on any ordinary power or lighting circuit. By referring to this figure it will be observed that I show a member 69, slidably mounted as at 70, and provided with a widened portion or plate 72 adapted to be engaged by the knee of an operator, who, by moving the part 69 may press down the push button 76, and thereby cause the energization of a relay 78 from the source of electric power 80, that may be made available for the operation of the machine by throwing the switch 81. When this energization of relay 78 occurs, the armatures 80 and 82 of the relay 78 move to establish a direct connection between the motor M and the source of power 80, and at the same time the coil 64 of the brake system magnet, already described in connection with Figure 2, is energized, because, as will be observed, the motor M and the coil 64 are shown as connected in parallel. Attention is further called to the resistance 88 in series with the relay 78 whereby it serves to reduce the voltage to which the latter is exposed and also for a purpose that will hereinafter appear. Attention is also called to the grounding of the push button side of the power source at G—2. It will be observed that resistance 88, relay 78 and push button 76 are in series across the power source 80 in the order named.

As the motor M commences to rotate it will actuate the rollers 30, 32 and 36 and thereby cause the advance of the spiral S, and at the same time the arm 66 of the bell crank lever is pulled by the magnet 60 and against the action of the spring 68, thereby releasing the brake band 54 from the brake drum 52.

While the advance of the spiral is intended to be initiated manually, as by a movement of the operator's knee or any other part of his body, as desired, I have shown means for stopping the advance of the spiral automatically by an arrangement which I will first describe in relation to the diagram of Figure 21, and will then describe in its practical application. The spiral S and substantially all parts of the machine, being metallic, they may serve as parts of an electrical circuit, and the spiral S, is from the electrical standpoint grounded to the frame of the machine, as indicated at G—1. A conductor 84 is shown as tapped off at a point intermediate the relay 78 and the resistance 88, and is shown as terminated by a contact 86 adapted to be interposed in the path of the advancing spiral, which is grounded, as already explained. It will be obvious from this description that as the spiral S advances and strikes the contact the relay 78 will be short circuited, because the lead 84 is substantially at ground potential, while the other side of the relay is also at ground potential, and consequently the armatures 80 and 82 thereof will be released, with the result that the power supply to the motor is cut off and simultaneously therewith coil 64 is deenergized and the bell crank lever 58 is released, whereupon the spring 68 pulls the brake band 54 taut, thereby bringing the roller system to a quick stop, and stopping the advance of the spiral S. This action, by proper proportioning and adjustment of the parts, may be made substantially instantaneous for all practical purposes.

The function of the resistance 88 will now be apparent. It will be understood to be that of preventing a dead short circuiting of the power source when the contact 86 is grounded through spiral S.

It will be understood that the push button 76 must be kept closed as long as the motor is to operate, as the motor will stop when the member 69 is released and the push button circuit is thereby opened. On the other hand, the automatic stopping of the motor will take place with the push button closed. In operating the machine, therefore, the operator will close the push button 76 to start the machine, and will keep the push button closed until the automatic action takes place, after which the push button must be released, so that the bound stack may be removed without immediately restarting the motor when the connection between the spiral S and contact 86 is broken.

By referring to Figure 1, which, it will be recalled, is a front elevational view of the machine, one manner of positioning the member 69, the plate 72 and the push button 76 in an actual machine will be apparent. The plate 72 is shown as located at such a height on a shelf of the table C of the machine that an operator, when sitting in front of the machine, will have his knee on a level therewith. To each side of plate 72, and of the operator, is positioned a pedal (these pedals being designated respectively 90 and 92), which may be operated each by one foot of the operator. The pedal 90 is connected to the mechanism that serves to move the roller 32 laterally to release the bound stack, which movement has already been mentioned hereinabove, and at the same time to move a portion of the stack guiding holder and the contact 86 laterally so that the threaded portion of the spiral may be removed from between the rollers. The pedal 92 serves to actuate the cutting device whereby the threaded portion of the spiral is severed from the main portion thereof.

Before describing further constructional details I will briefly describe a manner of use of my machine that I have found to be highly satisfactory. In accordance therewith the operator positions himself in front of the machine so that he may operate the plate 72 with one of his knees, the pedal 92 with his left foot, and the pedal 90 with his right foot. The end of the spiral S is introduced at the left of the machine, ready to be moved into the perforations of the stack P, which is introduced into the stack holder H so that it assumes the correct threading relation to the spiral. The operator next pushes the plate 72 and thereby threads the spiral into the stack. The movement of the spiral is automatically interrupted by the mechanism already described. Thereafter the operator releases the plate 72 (which up to the time of automatic stopping must be kept in its active position, as otherwise the stopping would occur too soon), and presses down the pedal 92 to cut off the binding element from the main body of the spiral S, and then releases pedal 92 and depresses the pedal 90, which moves the roller 32 laterally, carrying with it one of the plates of the holder H, thereby freeing the bound stack, which is then removed by the operator, who then releases the pedal 90.

The machine is then ready for the same cycle of operations in connection with another stack.

While I have described the use of an uncut spirally coiled wire S longer than needed for the binding of one stack, it will be understood that it is equally well adapted for the threading of binding elements previously cut to the exact length required, so that the use of the cutting machine actuated by the pedal 92 may be dispensed with.

I will now proceed with the description of the structural details of my mechanism.

It has already been mentioned that the roller 32 is journalled in the standards 96, and that it is movable away from the spiral coil S. This is shown as accomplished by making the standards 96 movable on guideways 98 provided on the end frames 39 of the machine. A block 102 is also shown as movable on each of said guideways but adapted to be clamped in fixed position relatively thereto by a set screw 134 (see Figure 6).

Carried by each standard 96 is a threaded extension 132 adapted to pass slidably through a bore provided in the adjacent block 102. A compression spring 100 is shown as mounted in each extension 132 and as interposed between its associated block 102 and standard 96. This spring tends to move the standard against the spiral coil S, but this action is limited by a stop member shown as in the form of a nut 136 carried in threaded relation by each extension 132, which nut abuts against the block 102.

It will therefore be understood that the blocks 102 may be positionally adjusted so that the roller 32 will be resiliently pressed against the spiral coil S. The pressure may be regulated as desired by means of nuts 136 together with suitable adjustment of the blocks 102. It will be observed that while movement of the standards 96 toward the axis of the spiral coil S is limited by the nuts 136, movement in the reverse direction is always possible, such movement taking place against the pressure of spring 100.

A pair of members 104, one of which is clearly shown in Figure 4, are shown as each connected for vertical adjustment, to one of the standards 96 by a screw 106 passing through the slot 108 of the member 104, and each member 104 is also shown as rigidly connected at one end thereof to a link 110, having a slot 112 therein. Passing through the slot 112 and vertically movable therein is shown a member 114 provided with a cam surface 116 adapted to engage the outer side of the slot 112. Each member 114 is shown as vertically slidable in a block 118, and it will be observed that as it is moved downwardly from the position shown in Figure 4 it will press against the outer side of the slot 112 and move the link 110 to the right, together with the associated member 104 and standard 96, in opposition to the action of spring 100.

The mechanism for moving the levers 114 downward comprises a pair of crank arms 122 carried by a rock shaft 124, journalled within the brackets 125, which are clearly visible in Figure 1. The rock shaft 124 is also shown as carrying a crank arm 126 pivotally connected, as at 128, to a rod 130, which carries the pedal 90 at its lower end.

By referring to Figure 6 it will be observed that the nut 136, shown therein, has a mark 138 thereon, and that the block 102 has thereon an arrow 140. It is to be understood that the other block 102 and the other nut 136 carry similar marks. This arrangement is found to be very convenient when adjusting a standard 96, as each turn of the nut 136 corresponds to a definite amount of movement of the standards 96.

A construction resembling that for the standards 96 is provided for the standards 94. Since these standards, however, are not intended to be moved laterally during the operation of the machine but are arranged only for adjustment, the parts corresponding to the blocks 102 need not be movable in relation to the frame of the machine but may form a fixed part thereof as shown at 142, these parts forming extensions of the end frames 39. The standards 94, are, however, slidable along guideways 144, for purposes of adjustment. Each standard 94 is shown as carrying thereon a threaded extension 146, that passes slidably through the member 142 and may be adjusted in relation thereto by a pair of nuts 148 and 150, the latter carrying a mark 152 whereby its angular position in relation to the arrow 154 on the member 142 (see Figure 7) is at once apparent.

In order to indicate the degree of adjustment of the standards 94 and 96 the outer end surface of each one of them is provided with a graduated scale 156 and the end frames 39 of the machine carry pointers 158, one of which slides over each of the scales 156 and thereby indicates the adjustment thereof. It will be observed that this system of markings together with the marks 138, 140, 152 and 154 form a species of micrometer that will accurately indicate the positions of the standards 94 and 96 in relation to the machine and in relation to each other, and will serve to disclose at a glance any unbalanced or otherwise undesirable adjustment.

The standards 96 are shown as connected by a rod 160 running parallel to the roller 32, and this rod is intended to carry the contact 86 already described in connection with the electrical circuits of Figure 21. The rod 160 is shown in end view in Figure 6 and in cross section in Figure 4, and a portion of it is shown in side elevation in Figure 5, in which may also be seen the contact 86 mounted thereon, the rod 160 and the contact 86 both being located to the rear of roller 36, as shown in the said figure.

In Figures 10 and 11 will be found the constructional details of a form of electrical contact 86 that I have found very effective. It is shown in these figures as a flat member slotted at 162, and having a portion 164 thereof projecting therefrom, so that with proper adjustment it may be caused to project into the path of the spiral S, as clearly appears from Figure 10. By referring to said figure it will further be seen that the rod 160 is shown as passing through the slot 162 and that the contact 86 is shown as clamped to said rod by an arrangement comprising the tubular member 166 provided with a tapered and slotted end 168, and adapted to seat on said tapered end is a nut 170, which is threaded on to the member 166, and, when suitably adjusted, serves to clamp the tapered end 168 of member 166 to the rod 160.

The member 166 is shown as provided with a shoulder 172 against which is positioned the stepped insulating bushing 174, the reduced portion of which is shown as passing through the slot 162 of the contact 86. The stop 86 is clamped in place on the bushing 174 by a second insulating bushing 176 that may be forced against the contact 86 by a nut 178 threaded on the member 166.

It will be observed that this construction provides a convenient adjustment for the contact 86, whereby it may be adjusted so that the portion 164 thereof projects into the path of the spiral S, when the roller 32 is in its spiral-engaging position, or to clear the path of the spiral when the roller is moved laterally. In Figure 10 will be observed the electrical connection 84 already described in connection with Figure 21, whereby the contact 86 is connected to one branch of the electrical power source 80.

Intermediate the standards 94 and 96 and beneath the roller 36 is shown a pair of longitudinally extending members 180 and 181, bridged at their upper portions by a series of transversely extending members 218, which determine the vertical position of the stack to be perforated. The members 180 and 181 are connected at each end by a plate 183 (see Figures 5 and 20) slidably mounted on an end frame 39 for vertical adjustment in relation thereto, and adapted to be clamped thereto by a set screw 135 shown as threaded into the plate 183, and passing through a slot in the end frame 39.

The members 180 and 181 are mounted so that they may be accurately adjusted in a vertical direction, as indicated in Figure 1, in which they are shown as supported on two pedestals 182 and 184, one of these pedestals being shown in detail in Figure 18. By referring to the latter figure, which shows the pedestal 182, it will be seen that the same comprises a socket member 186 fastened to the bed of the machine in any suitable or preferred manner. Rotatably seated within said socket is a member 188, shown as provided with a knurled adjusting head 190, and which is retained in the socket by a pair of locknuts 202 and 204 in threaded engagement with an extension 200 of the lower end thereof. A threaded member 192 in threaded engagement therewithin passes therethrough, so that as the member 188 is turned, the threaded member 192 will be raised or lowered. The member 192 carries a threaded extension 194 at its upper end, that is adapted to screw into a socket 196, secured to the members 180 and 181 in any preferred or desired manner, and this extension 194 may be locked in place in the socket 196 by any suitable or preferred means, as by the locknut 198 provided thereon, which locknut is adapted to seat against a shoulder provided on the socket 196. It will be seen that this arrangement prevents turning of the member 192 when vertical adjustment thereof by means of the knurled head 190 is attempted. For convenience in adjusting the member 192 in relation to the socket 196, where that may be necessary, the member 192 may be provided with a squared head 206.

It is to be understood that the construction of the pedestal 184 is identical with that of the pedestal 182, and that by suitably adjusting these two pedestals, the members 180 and 181 may be raised or lowered into any desired position.

I have also provided, in connection with the members 180 and 181, indicating means that will serve to indicate their position in relation to the bed of the machine. For this purpose each of the plates 183, carrying the members 180 and 181, is shown as provided on the inner surface thereof with graduations, shown at 208 in Figure 20, which shows fragmentary portions of both ends of the machine. On each of the end frames 39 of the machine is provided a pointer 210 in relation to which the graduations 208 move as the members 180 and 181 are adjusted vertically. These indicators and graduations thereby serve to indicate the vertical position of the member 108.

A further refinement is provided by a reference mark 202 carried by each of the socket members 188 of the pedestals 182 and 184 and these marks move in relation to graduations 214 on the socket members 186. It will be observed that this system of indicators provides a highly accurate means for determining the adjustment of the members 180 and 181.

The members 180 and 181, as already mentioned, are shown as bridged across their upper portions by a series of members 218 that may be likened in their entirety to the teeth of a comb (see Figures 5 and 17), and these members are curved as clearly shown in Figure 17, in such a manner that when a stack P is placed with its back resting thereon, the said back will be caused to assume an arched contour, so that the perforations N of the stack instead of being like straight tubes passing through the stack will assume the contour of curved tubes, thereby more closely conforming to the contours of the coils of the spiral S, which consequently will more readily pass through these perforations, whereby it is possible to make the perforations N smaller in diameter than would otherwise be necessary. The members 218 have been shown as integral with members 180 and 181, but obviously they may be separate pieces, and they are further shown as angularly positioned so as to provide the maximum clearance for the coils of the spiral, that pass therebetween, as clearly shown in Figures 1, 5 and 12.

The roller 36 is shown as journalled at 37 (see Figures 5 and 19) in bearing blocks 220 shown as provided with guide grooves 222 slidable over vertical guide rails 232 carried by members 180 and 181. Each of said members 220 carries, secured to the lower side thereof, a retaining member 224 provided with a socket adapted to retain therewithin the head 226 of a threaded member 228 that is in threaded engagement with member 229 secured to the members 180 and 181, and this threaded member is shown as provided at its lower end with a knurled head 230 whereby it may be turned so as to raise or lower the bearing blocks 220 in relation to the members 229, 180 and 181.

In order to indicate the vertical position of the bearing blocks 220, each of them is shown as carrying a reference mark in the form of an arrow 234, that is opposed to the graduations 236 provided on the outer end of the member 181, as shown in Figure 6, and similar graduations at the other end of the machine. By providing such an indicating arrangement at each end of the machine, accurate adjustment of the position of roller 36 is readily effected.

In order to position the stack so that its perforations assume a proper relation to the coils of the spiral to be threaded thereinto, I provide an arrangement H, comprising a longitudinally extending bar 238 mounted on the standard 94 by means of a bracket 240, and a similar bar 242 mounted on the standard 96 by means of a bracket 244 (see Figures 1, 4, 6, 8, 9, 16 and 17). The bar 238 serves to support the guide plate 246 shown in plan in Figure 8, and in section in Figure 16, while the bar 242 supports a guide plate 247. Both of the plates 246 and 247 are slotted at their lower edges, as shown at 251 (see Figures 1, 16 and 17), so that the coils of the spiral may pass therethrough, and these plates are spaced so that normally they will serve to hold the sheets of a stack P together and in correct threading relation to the spiral S. When the standards 96 are moved laterally however, to release the spiral, the plate 247 moves therewith so as to release the stack.

Above the plate 247 and forming in effect a vertical continuation thereof is a guide plate 248 (see Figures 6, 8, 9 and 16), mounted so as to slide in relation to the bar 242, for which purpose it is shown as provided with flanges 250 having overhanging portions thereon, and slidably engaging a guide bar 252 mounted on the bar 242. A standard 254 is also carried by the bar 242, and supported thereon and extending in a horizontal direction is shown a rod-like element 256 which passes in slidable engagement through the lug 258 of the plate 248, and carries at its free end a pair of locknuts 260. It will be observed that the parts so far described permit a sliding of the plate 248 along the bar 252 and the rod 256. A compression coil spring 262 is shown as encircling the rod 256 and pressing the lug 258 against locknuts 260, but yet permitting lateral movement of the plate 248 against the pressure of the spring 262.

It will be seen that the stack is held together against lateral separation by the plates 246, 247 and 248, and that its lower edge is supported and shaped by the members 218. Stop means is further provided for one end of the stack by plate 264 pivoted as at 266 to one end of the plate 248 (see Figures 6, 8 and 9), whereby it is angularly adjustable in relation to the plate 248. It may be held fixed in any desired position of adjustment by a construction including a bracket 268 carried by the plate 248 and having a slot 270 therein, through which passes a screw 272 in threaded engagement with the plate 264. The screw 272 is provided with an enlarged knurled head 274 whereby the plate 264 may be clamped into any desired angular relation to the plate 248. When the end of a stack P is placed into abutting relation to the plate 264 it will be biased so as to conform to the angular position of the coil portions of the spiral that pass through the perforations, thereby further causing the perforations N of the stack to conform to the contour of those portions of the coils of spiral S that pass through said perforations.

Before commencing the operation of the machine the position of the stop plate 264 must be adjusted so that the perforations of the stack are in proper relation to the coils of the spiral. This involves adjustment of the locknuts 260, as a result of which the position of the plate is adjusted axially in relation to the spiral binding element, into the desired position.

In operating the machine, the operator takes a stack of sheets and inserts them between the plates 248 and 246, and permits the stack to drop down until it strikes the members 218, and the back of the stack is arched thereby, and at the same time the operator causes the stack to bias by pressing its end against the end or stop plate 264.

In order to assure proper entry of the spiral binding element into the perforations of the stack he may then slide the plate 248 endwise to a slight degree, against the pressure of spring 262 so as to "feel" for the end of the spiral binding element. I have found that this additional precaution, together with proper preliminary adjustment of the parts will result in a substantial freedom from failure of the end of the spiral to enter the perforations. Instead of the simple movement just described a sort of rapid vibratory movement of the plate 248 may be used, this movement as well as the preceding one being of course of very limited extent, since the parts may be adjusted with such refinement that in most cases the manipulations just described are unnecessary.

I will now describe the mechanism by which the spiral S may be cut, for the purpose of separating a portion used as a binding element from the main body of the spiral, and this description may be understood with the aid of Figures 1, 4, 5, 12, 13 and 14.

By referring to Figure 1 it will be observed that the pedal 92 is shown as carried by a rod 276, that is shown as passing through the bed plate B of the machine, and as threaded into a member 278, in which it is held by a locknut 280 (see Figures 1, 4, 5 and 13). Above the bed plate of the machine is shown an abutment 282, in the form of a nut applied to the threaded portion of the rod 276, and positioned intermediate nut 282 and the bed of the machine is a compression spring 284, the function of which is to raise the rod 276 and the pedal 92 after they are depressed.

The details of the cutting elements and of the associated mechanism are illustrated in Figures 4, 5, 12, 13 and 14. They comprise a pair of elements 286, provided with slots (see Figure 4), through which passes the roller 36, and the upper surfaces of these elements 286 are of substantially the same conformation as the upper surfaces of the elements 218. Each member 286 is shown as carried by an element 288 pivotally mounted, as shown at 290, in members 278 (see Figures 5, 12, 13 and 14). The tension spring 292 suitably applied to the members 288 serves to cause the members 286 normally to separate from each other. The members 288 are provided with the cutting jaws 294 (see Figures 5, 12, and 13) so positioned that when they are separated, as shown in Figure 12, a coil of the spiral S will pass freely therebetween, but when they are closed they will cut the coil. This will be understood from an inspection of Figure 12, and from an inspection of Figure 17 it will further be observed that since the cutting jaws, which are on a level with the upper surfaces of members 218, are disposed substantially perpendicularly to the course of the spiral, the latter will be cut substantially squarely across the wire of which it is made.

In order to effect this cutting action I have provided mechanism actuated by the pedal 92 to cause the jaws 294 to close against each other. For this purpose I have shown pairs of links 296 pivotally mounted at 298 on the members 180 and 181, and these links are arranged to have their free ends abut against the members 286. Pivotally attached, as at 300, to each of said links 296, is one end of a link 302, there being a pair of these links in each side of the machine, and both of the links 302 of a pair are shown as pivotally mounted at their opposite ends on a screw 304 that is held adjustably within a slot 306 provided in an extension of the member 278 by means of a nut 308.

When the operator steps on the pedal 92 the member 278 will be moved down and the links 302 will cause the links 296 to press against the members 286, so as to cause the cutting jaws 294 to come together and to cut the spiral S. As soon as the pedal 92 is released, the spring 284 causes the member 278 to rise, while the spring 288 causes the cutting jaws 294 to separate.

It will be observed that the action of the cutting jaws 294 may be equalized and adjusted in relation to the coils of the spiral S by shifting the pin 304 laterally in the slot 306.

In Figure 3 is shown a figure-like element 310, positioned on the member 180 and extending above the lower portion of one of the coils of the spiral. This element is also shown in Figures 5, 12 and 13, and from these figures, particularly Figure 12, it will be seen that its end portion is positioned within the end of the main body of the spiral after it is cut and so as to engage one of the end coils thereof.

The desirability of such an arrangement will appear from Figure 1 in which the spiral S is shown as lead over a curved guideway 312 and between the rollers of the machine. It will be obvious from Figure 1 that as the spiral is cut it will tend to straighten out and its free end will tend to move upward. In addition there is a tendency for the spiral by its own weight to move backward and to drop out of the machine. These undesirable movements of the spiral will be prevented by the element 310, just described, which will engage the lower portion of one of the coils of the spiral, so as to prevent the upward movement thereof and will also prevent backward movement.

The guide 312 is shown as mounted for vertical adjustment in the socket 314 carried by the frame of the machine. While it is shown as curved, and this form has many advantages, such as that of saving space in a horizontal direction, it will be obvious that for other purposes straight guides or guides of other conformations may be found to be more suitable.

While I have shown one illustrative embodiment of my invention it will be understood that it may be embodied in many other forms as will be obvious to those skilled in the art without departing from the spirit thereof, and that the disclosure herein is by way of illustration only, and is not intended to be limiting in any sense, and that I do not limit myself in any way other than as called for by the prior art.

Having thus described my invention and illustrated its use what I claim is new and desire to secure by Letters Patent is:

1. In a machine for threading a spiral binding element through the perforations of a stack of sheets having perforations therein adapted to receive said spiral element, a set of three power driven rollers, having their axes parallel to each other, and adapted to be spaced so as to engage the sides of the spiral element, one of said rollers being positioned below the other two rollers and being vertically adjustable in relation thereto and the other two rollers being laterally separable, annular guide grooves in said last-mentioned rollers adapted to receive the coils of said spiral binding element therewithin, vertically adjustable means for supporting the perforated stack with its perforations in the path of movement of the spiral binding element, said means having a portion thereof mounted for resilient endwise movement, power means for actuating said power driven rollers, control means for starting said power means, means automatically active when the advancing spiral has reached a predetermined point to shut off the power means and simultaneously therewith to retard and stop the rotation of the rollers, and pedal-operated means for separating said laterally separable rollers so as to release the bound stack.

2. In a machine for inserting spiral binding elements into the perforations of a stack of sheets adapted to receive the same, means for rotating and advancing a spiral coil in an axial direction so as to cause it to enter the perforations of the stack, means for severing a spiral binding element from the main body of the spiral coil, and means projecting into the space within the spiral coil for holding the free end of the main body of the spiral coil, after the severing means has operated, against substantial displacement.

3. In a machine for inserting spiral binding elements into the perforations of a stack of sheets adapted to receive the same, means for rotating and advancing a spiral coil in an axial direction so as to cause it to enter the perforations of the stack, means for severing a spiral binding element from the main body of the spiral coil, and means for holding the free end of the coil, after the severing main body of the spiral coil, after the severing means has operated, against substantial displacement.

4. In a spiral binding machine, means for guiding and causing the rotation and axial advance of the spiral binding element, said means comprising three rollers having their axes parallel to and spaced from each other so as to retain and guide the spiral therewithin, and one of said rollers being opposed to the other two rollers, and means for adjusting the positions of said last mentioned rollers toward or away from each other, said means comprising a screw and nut adjustment, and indicating means to indicate the amount of said adjustment, said indicating means including indicia to indicate the angular position of said nut in relation to said screw.

5. In a spiral binding machine, means for guiding and causing the rotation and axial advance of the spiral binding element, said means comprising three rollers having their axes parallel to and spaced from each other so as to retain and guide the spiral therewithin, and one of said rollers being opposed to the other two rollers, and means for adjusting the positions of said last mentioned rollers toward or away from each other, said means comprising a screw and nut adjustment, and indicating means to indicate the amount of said adjustment.

6. A machine for inserting spiral binding elements into stacks of perforated sheets adapted to receive said element, said machine having a plurality of rollers adapted to engage the sides of the spiral binding element and to cause the rotation and advance thereof into the perforations of the stack, means for rotating at least one of said rollers, means for holding the stack of perforated sheets in correct threading relation to the coils of the advancing spirals, said last mentioned means comprising lateral walls and an end wall, said end wall being resiliently mounted so as to permit endwise movement of said stack, and said resilient means causing said end wall to tend to assume a normal relation to the path of the spiral.

7. In a machine for threading a spiral binding element into the perforations of a stack of sheets adapted to receive said element, means for causing relative movement between the stack and the spiral binding element, and means for relatively positioning said stack so that the relative path of the spiral passes through the perforations of the stack, a mounting for said positioning means whereby it is adapted for limited movement from a normal position, and resilient means tending to cause return of said positioning means to the said normal position when it is displaced therefrom.

8. In a spiral binding machine, means for causing the rotation and axial advance of a spiral binding element into threaded engagement with the perforations of a stack of sheets, said means comprising a set of rotatable rollers adapted to engage a spiral binding element so as to confine it therebetween and to rotate and advance it, a source of motive power for actuating said rollers, one of said rollers being movable so as to permit disengagement of the spiral element from between the rollers, automatic stop means adapted to project into the path of the advancing spiral and to disconnect the motive power when the end of the advancing spiral contacts the same, said means being so associated with said movable roller that when the latter is moved to release the spiral the stop means will be moved out of the path of the spiral.

9. In a spiral binding machine, in combination: means for causing the rotation and axial advance of a spiral binding element into threaded engagement with the perforations of a stack of sheets, said means comprising a set of rotatable rollers adapted to engage a spiral binding element so as to confine it therebetween and to rotate and advance it, a source of motive power for actuating said rollers, a carriage within which one of said rollers is journalled, said carriage being movable so as to permit disengagement of the spiral element from between the rollers, stop means adapted to project into the path of the advancing spiral and to disengage the motive power when the end of the advancing spiral contacts the same, said means being mounted on said movable roller carriage so as to move therewith, so that when said carriage is moved to release the spiral the stop means will be moved out of the path of the spiral and will not interfere with its release.

10. In a machine for threading spiral binding elements having a frame and means for threading a spiral binding element into the perforations of a stack of sheets, positioning means for said stack of sheets whereby it may be held in proper threading relation to the advancing spiral, said means comprising a pair of lateral members for holding the sheets of the stack together, means for engaging the back of the stack, and means slidable in relation to the frame of the machine and carrying a member for determining the position of the end of the stack, and means for causing said slidable means to assume a normal position in relation to said machine when it is free to move.

VINCENZO CATINI.